Patented Mar. 22, 1932

1,850,144

UNITED STATES PATENT OFFICE

FRIEDRICH STOLZ, OF FRANKFORT-ON-THE-MAIN-HOCHST, AND WALTER KROHS AND HANS SCHLICHENMAIER, OF BAD-SODEN, GERMANY, ASSIGNORS TO I. G. FARBEN-INDUSTRIE AKTIENGESELLSCHAFT, OF FRANKFORT-ON-THE-MAIN, GERMANY, A CORPORATION OF GERMANY

PROCESS OF PREPARING HYDROGENATED AROMATIC CARBOXYLIC ACID ESTERS

No Drawing. Application filed May 2, 1929, Serial No. 360,006, and in Germany February 26, 1927.

Our present invention relates to a new process of preparing hydrogenated aromatic carboxylic acid esters, more particularly to compounds of the following constitution:

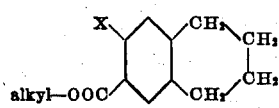

wherein X stands for hydrogen or hydroxyl or amino-group. According to this invention aromatic carboxylic acid esters can be hydrogenated in a very short time, with a nearly quantitative yield when using nickel catalysts in a closed vessel at moderate pressures and temperatures between 120° C. and 150° C. Such nickel catalysts may consist of nickel alone or of a mixture containing nickel and one or more other metals of the iron group or copper and are prepared by precipitating from the respective metallic salt solutions insoluble metallic compounds on a support at an elevated temperature and reducing them to the metal in a current of hydrogen at a temperature above 400° C.

The following examples serve to illustrate the invention, but they are not intended to limit it thereto, the parts being by weight, unless otherwise stated.

(1) 250 parts of benzoic acid-ethylester are hydrogenated at 130° C. to 150° C. and under a pressure of hydrogen of 30 to 40 atmospheres in an autoclave provided with a stirrer with 10 parts of a nickel catalyst which has been prepared according to the following prescription:

290 g. of nickel nitrate are dissolved in 2 liters of water and the nickel is precipitated at 80° C. in the form of the carbonate in the presence of 100 g. of a carrier such as pumice stone or silicic acid with the calculated quantity of 1 normal soda solution. The reduction of the carbonate occurs in a current of hydrogen at a temperature which makes a transformation into the metal possible and which generally is between 400° C. and 600° C., preferably at 500° C. After the absorption of hydrogen is finished and the whole is cooled, the mass is freed from the nickel by filtering with suction and the hexa-hydrobenzoic acid-ethylester of the formula:

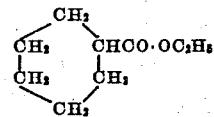

is distilled in a vacuum. The yield is nearly quantitative.

(2) 100 parts of phenylacetic-acid-ethylester with 3 parts of the nickel catalyst described in Example 1 yield when treated and worked up in the manner indicated in the preceding example, the hexahydrophenylacetic acid-ethylester of the formula

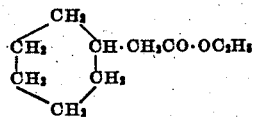

with a nearly quantitative yield.

(3) By treating in the same manner 100 parts of salicylic acid-methyl ester and 3 parts of a catalyst consisting of 90 per cent of nickel and 10 per cent of cobalt and prepared as indicated in example 1, the hexahydrosalicylic acid-methylester of the formula:

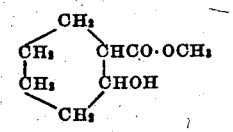

is obtained which boils at 96° C. to 103° C. under 8 mm. pressure.

(4) 300 parts of phthalic acid-diethylester are hydrogenated with 8 parts of the nickel catalyst described in Example 1 in the course of one hour at 130° C. to 150° C. and under a pressure of hydrogen of 30 to 40 atmospheres. The product is worked up as indicated in Example 1 and the hexahydrophthalic acid-diethylester of the formula:

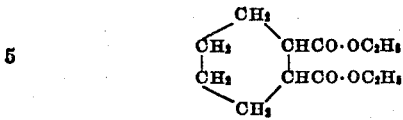

is thus obtained with a quantitative yield.

(5) 50 parts of terephthalic acid dimethyl-ester are dissolved in 100 parts of decahydro-naphthalene and hydrogenated in the presence of 2 parts of the nickel catalyst described in Example 1, under the above-stated conditions. After the mass has cooled and the nickel has been separated therefrom, the decahydronaphthalene is first distilled in a vacuum and afterwards the hexahydroterephthalic acid-dimethylester of the formula:

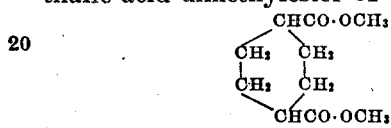

which distils at 133° C. to 139° C. under 13 mm. pressure. It consists of a mixture of the cis- and trans-form and partly solidifies in the receiver.

(6) 50 parts of α-naphthoic acid-ethylester are hydrogenated with 2 parts of the nickel catalyst described in Example 1 under a pressure of hydrogen of 30 atmospheres and at a reaction temperature of 120 C. Thus the 5.6.7.8-tetrahydro-1-naphthoic acid - ethylester is obtained boiling at 156° C. to 159° C. under 12 mm. pressure. It has the structural formula:

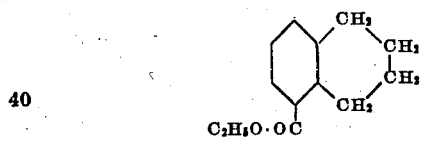

(7) 43.2 parts of 2.3-hydroxynaphthoic acid-ester together with 400 parts of decahydronaphthaene and 1.3 parts of the nickel catalyst described in Example 1 are subjected in a drum provided with a stirrer to a pressure of hydrogen of 25 atmospheres. When the drum is heated, the pressure begins to decrease at 100° C. to 110° C. The temperature is gradually raised to 130° C. to 140° C. The absorption of hydrogen now occurs very quickly. When it is finished, the product is allowed to cool, the catalyst is filtered therefrom by suction and the product of the reaction is distilled in a vacuum. The decahydronaphthalene distills first, and afterwards under 17 mm. pressure at 170° C. the 5.6.7.8-tetrahydro-2.3-hydroxynaphthoic acid-ester distils and solidifies in the receiver as a colorless crystalline mass consisting of thin needles. The ester forms a sodium salt of an intense yellow coloration which is very sparingly soluble in water, whereas the potassium salt is more readily soluble therein. On saponifying with caustic potash there is immediately obtained in the usual manner the 5.6.7.8-tetrahydro-2.3-hydroxynaphthoic acid in a pure state.

The 5.6.7.8-tetrahydro-2.3-hydroxynaphthoic acid-ethylester has the following formula:

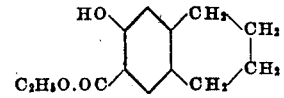

(8) 43.2 parts of 2.3-aminonaphthoic acid-ethylester are treated with hydrogen in the above described manner. After cooling the contents of the bomb is separated from the nickel by filtering with suction and the 5.6.7.8-tetrahydro-2.3-aminonaphthoic acid-ester is freed from the decahydronaphthalene by means of dilute sulfuric acid. The sulfate crystallizes in the form of beautiful colorless, entirely felted needles. It is sparingly soluble in dilute sulfuric acid; on the addition of water it immediately dissociates while forming the free ester. The free ester is more easily obtained by pouring sodium acetate over the sulfate. It melts at 55° C. to 58° C. On saponifying it by means of alcoholic caustic soda solution, the 5.6.7.8-tetrahydro-2.3-aminonaphthoic acid is obtained in the usual manner. By recrystallizing this product from chlorobenzene, it is obtained in the form of well-defined very lustrous needles melting at 178° C.

The 5.6.7.8-tetrahydro-2.3-aminonaphthoic acid-ethylester has the following formula:

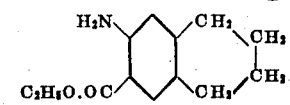

(9) 300 parts of phthalic acid-diethylester are hydronated with 8 parts of a catalyst containing the metals nickel, cobalt and copper in the proportion of 20:7:1 and being prepared as indicated in Example 1, in the course of one hour at 130° C. to 150° C. and under a pressure of hydrogen of 30 to 40 atmospheres. The product is worked up as indicated in Example 1 and the hexahydrophthalic acid-diethylester is obtained with a quantitative yield.

The term "nickel catalyst" used in the following claims is to be understood as comprising equivalent catalysts consisting of nickel and one or several other metals of the iron group or copper and being prepared as indicated in the description.

This application contains subject matter in common with our co-pending application Ser. No. 256,807 filed February 24, 1928, and is to be regarded as a continuation-in-part of said application.

We claim:

1. The process which comprises heating to a temperature of about 120° C. to about 150° C. an aromatic carboxylic acid ester with hydrogen under pressure in the presence of a nickel catalyst prepared by reducing a nickel salt precipitated on a carrier in a current of hydrogen at a temperature of between 400° C. and 600° C.

2. The process which comprises heating to a temperature of about 120° C. to about 150° C. an aromatic compound of the following formula:

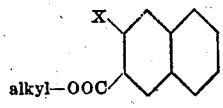

wherein X stands for hydrogen or a hydroxyl or amino group, with hydrogen under pressure in the presence of a nickel catalyst prepared by reducing a nickel salt precipitated on a carrier in a current of hydrogen at a temperature of between 400° C. and 600° C.

3. The process which comprises heating to a temperature of about 120° C. to about 150° C. an aromatic compound of the following formula:

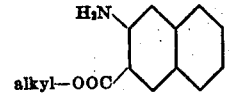

with hydrogen under pressure in the presence of a nickel catalyst prepared by reducing a nickel salt precipitated on a carrier in a current of hydrogen at a temperature of between 400° C. and 600° C.

4. The process of preparing 5.6.7.8-tetrahydro-2.3-amino-naphthoic acid ethylester which comprises heating to a temperature of about 120° C. to about 150° C. 2.3-aminonaphthoic acid-ethylester with hydrogen under pressure in the presence of a nickel catalyst prepared by reducing a nickel salt precipitated on a carrier in a current of hydrogen at a temperature of between 400° C. and 600° C.

5. The process which comprises heating to a temperature of about 120° C. to about 150° C. an aromatic compound of the following formula:

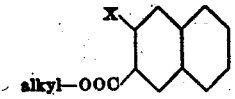

wherein X stands for hydrogen or a hydroxyl or amino group, with hydrogen under a pressure of 30 to 40 atmospheres in the presence of a nickel catalyst prepared by reducing a nickel salt precipitated on a carrier in a current of hydrogen at a temperature of between 400° C. and 600° C.

6. The process which comprises heating to a temperature of about 120° C. to about 150° C. an aromatic compound of the following formula:

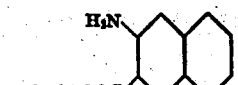

with hydrogen under a pressure of 30 to 40 atmospheres in the presence of a nickel catalyst prepared by reducing a nickel salt precipitated on a carrier in a current of hydrogen at a temperature of between 400° C. and 600° C.

7. The process which comprises heating to a temperature of about 120° C. to about 150° C. 2.3-aminonaphthoic acid-ethylester with hydrogen under a pressure of 30 to 40 atmospheres in the presence of a nickel catalyst prepared by reducing a nickel salt precipitated on a carrier in a current of hydrogen at a temperature of about 500° C.

In testimony whereof, we affix our signatures.

FRIEDRICH STOLZ.
WALTER KROHS.
HANS SCHLICHENMAIER.